INVENTORS
RENÉ A. GREA
RENÉ A. HIGONNET
BY Kenway Jenney Witter & Hildreth
ATTORNEYS

METHOD AND APPARATUS FOR TYPE COMPOSITION

Filed Oct. 8, 1959 3 Sheets-Sheet 2

INVENTORS
RENÉ A. GREA
RENÉ A. HIGONNET
BY Kenway, Jenney, Witter & Hildreth
ATTORNEYS Jan. 17, 1961 R. A. HIGONNET ET AL 2,968,383
METHOD AND APPARATUS FOR TYPE COMPOSITION
Filed Oct. 8, 1959 3 Sheets-Sheet 3

INVENTORS
RENÉ A. GREA
RENE A. HIGONNET
BY Kenway Jenney Witter & Hildreth
ATTORNEYS United States Patent Office 2,968,383

Patented Jan. 17, 1961

2,968,383

METHOD AND APPARATUS FOR TYPE COMPOSITION

René A. Higonnet, Cambridge, Mass., and René A. Grea, Chatou, France, assignors to Graphic Arts Research Foundation, Inc., Cambridge, Mass., a corporation of Delaware Filed Oct. 8, 1959, Ser. No. 845,237

Claims priority, application France Oct. 17, 1958

18 Claims. (Cl. 197—20)

The present invention relates generally to methods and apparatus for type composition, and more particularly to composition of a plurality of lines of type on a keyboard, storage of the lines in a register such as a perforated tape adapted to permit transfer of the text line-by-line and character-by-character within each line to a typesetting machine, and transcription of the lines by said machine in justified form.

A principal object of this invention is to provide separate machines for composing the type on the one hand, and transcribing it in justified form on the other hand. Certain advantages of this division of apparatus have long been recognized in the type composing art, especially in hot metal typesetting.

A second object related to the first is to permit a simplified, conventional and relatively inexpensive structure for the portion of the apparatus including the keyboard on which the type is composed. This will not only permit a relatively expensive typesetting machine to be operated to produce text composed on a relatively inexpensive keyboard machine, but will also permit more efficient use of the typesetting machine by transferring to it the outputs of more than one keyboard machine.

Another object of the invention is to provide means whereby correction and editing of the text after it has been composed may be carried out before it is transferred to the typesetting machine, whereby the efficiency of this machine is increased through restriction of its use to the final corrected and edited text from which printing plates are to be manufactured.

Another object is to provide apparatus whereby a body of text may be composed once at a keyboard, said text being entered into a register such as a tape, and the register may be used repeatedly in a typesetting machine to cause said machine to reproduce the text in justified form in any desired number of different styles, sizes and set widths of type, and in any desired number of different line or column widths.

With the foregoing and other objects in view, the features of this invention include the provision of a keyboard machine of simplified design and construction, this machine being used to produce a typewritten "hard" copy of the text and to enter coded information corresponding to the selected characters of text in a register. In the description hereinafter given this register takes the form of a paper tape in which the information is entered by means of coded perforations in a well-known manner. The register may also take the form of a magnetic tape on which discrete bits of information may be stored in accordance with well-known techniques. Insofar as this invention is concerned, the specific form of the register is not material, and any means having the equivalent function as understood in this art will suffice to realize the advantages hereinafter described.

Another feature resides in the provision of a typesetting machine adapted to be operated by a perforated tape or other equivalent register to set the text composed thereon in justified form, with the style, size and set width being determined independently of the tape by the operator of the typesetting machine.

The invention is described hereinafter as carried out by the use of a specific photographic typesetting machine of the type described in detail in a number of copending applications. The copending application of Higonnet, Moyroud and Hanson Serial No. 687,572, filed October 1, 1957, describes a machine for photographing lines of text on a film in justified form, the characters having variable widths, and with provision for varying the style, size, set width, line length, tabulation, leading and other features of the text in accordance with the high standards of precision in the type composing art. As described in said application, the text information is stored in a register having depressable pins, and the information relating to the justification requirements of each line are sent to the machine by circuits described in detail in the copending application of Higonnet and Moyroud Serial No. 531,023, filed August 29, 1955. This latter application contains a detailed description of the apparatus in which the justification information is computed, the description being further amplified by reference to the application of Higonnet and Moyroud Serial No. 500,397, filed April 11, 1955, now abandoned, of which their copending application Serial No. 741,209, filed June 9, 1958, is a continuation.

The photocomposing machine described in its several parts in the above-mentioned copending applications and other applications and patents therein referred to has a keyboard and a register in which information corresponding to only a single line is stored at one time. Following the storing of a line, the information in the register is sent to the transcribing unit where it is photographed, the speed of transcription being sufficiently great that the register is free for recording the next line without requiring the operator to wait substantially longer than the time ordinarily required for returning the carriage of a typewriter.

A further feature of this invention resides in the utilization of the machine disclosed in said copending applications, with certain modifications and additional circuits hereinafter described, whereby the machine may be operated by a perforated tape or an equivalent register, the tape having been prepared on a keyboard other than the one directly associated with the machine described in said applications.

Other features of the invention reside in the provisions for correcting the text stored on the perforated tape or equivalent register, whereby a corrected tape or equivalent register is prepared for use in the typesetting machine.

Other features of the invention reside in certain details of the methods, the apparatus and the circuits hereinafter to be described, and in the modes of operation thereof which will become evident from the following description, having reference to the appended drawings illustrating the same.

*Tape perforator*

The tape perforator machine according to this invention is of conventional construction well known to the art and is not described herein with reference to the details of its parts. In general, it comprises a typewriter T1 (Fig. 4) preferably having electrically-driven power means to actuate the type bars, with either equal spacing between characters in each line or proportional spacing (variable width spacing) as presently provided in many typewriters now on the market. The typewriter produces a typewritten copy of the text as it is composed, called a "hard copy," without justification. Associated with the keys of the keyboard is a tape perforator P1 having eight so-called "channels." The paper tape is in the form of a roll which is automatically indexed longitudinally after each key actuation. Eight punches are equally-spaced in a line transversely of the tape, each punch being associated with a channel. The keys of the keyboard include the usual character keys, word space bar, case shift key which automatically locks in the upper case when depressed, case shift release key which is depressed to permit return to the lower case and carriage return key which returns the carriage of the typewriter in the conventional manner. It will be understood that the character keys include not only the letters of the alphabet but also numerals, symbols and punctuation making up a complete font of type.

In addition, the keyboard has two special keys designated the "discretionary hyphen" key and the "end-of-paragraph" key. The uses of these keys are fully described below.

The keyboard unit does not ordinarily contain means for selecting the style, set width or size of the composed characters, these features being selected by settings on the typesetting machine itself as disclosed in said applications.

The keys of the keyboard produce tape perforations according to the codes listed below, wherein the channels are numbered transversely of the tape from "1" to "8":

| Key | Positions of Tape Perforations |
|---|---|
| identification of characters | combinations of 1 to 6. |
| shift case to capitals | 1, 4, 5, 6. |
| release case shift | 2, 4, 5, 6. |
| word space | 1, 2, 3, 5. |
| flush right | 1, 3, 5, 6. |
| carriage return | 1, 3, 5, 6, 8. |
| end-of-paragraph | 1, 3, 5, 6, 7, 8. |
| hyphen | 2, 3, 4, 5. |
| discretionary hyphen | 2, 3, 4, 5, 7. |

A second form of tape perforator unit, which may be used for editing purposes as described below, comprises a typewriter T2 with a tape perforator P2 identical to the units T1 and P1, respectively, to which is added a tape reader R2. This reader operates both of the units T2 and P2, reproducing the input tape perforations in the output tape and also producing a new hard copy.

*Variations in use of perforated tape*

Figure 4:
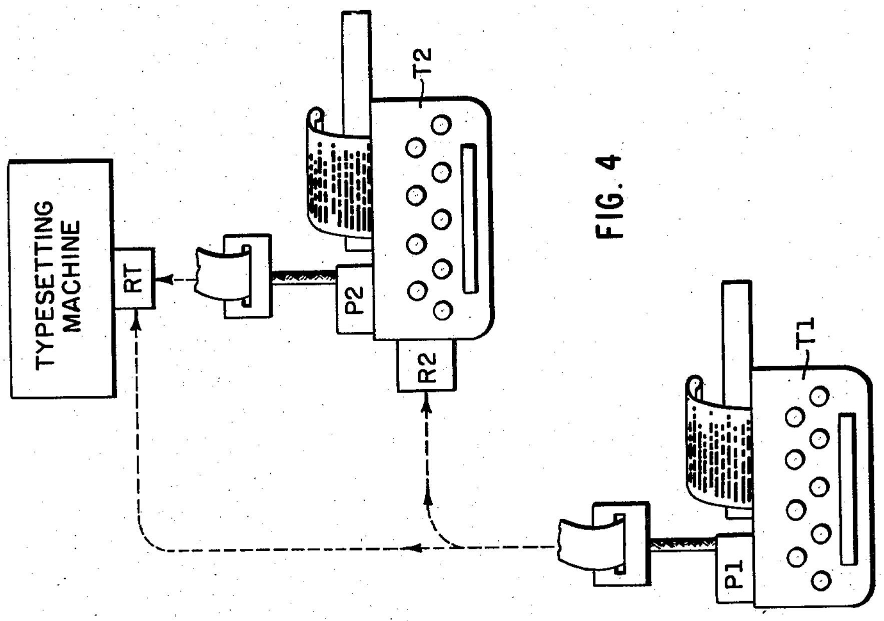
Fig. 4 is a block diagram illustrating the composing procedures according to this invention.

The tape composed on a tape perforator unit may be transferred directly to a typesetting machine which, as described herein, takes the form of the photographic type composing machine disclosed in detail in said copending applications. Alternatively, however, an intermediate step may be performed which permits correction or editing of the text as originally composed. In general this is done as shown in Fig. 4 by placing the original tape reader in a second keyboard-operated tape perforator having a tape. This second perforator unit produces a second coded tape which is then transferred to the typesetting machine. It will be noted that the typewritten or "hard" copy produced on the first tape perforator provides a convenient proof on which the corrections and editing can be written. More specifically, the procedure in this case consists in placing the original tape in the reader of the second tape perforator, operating the latter to cause the perforations on the first tape to be duplicated on the second tape and simultaneously typed on the second hard copy, stopping the tape reader when a section of the original tape to be deleted is reached, typing on the second hard copy and simultaneously entering on the second tape the edited or corrected text, and recommending the reading of the first tape at the position where the correct text is resumed. Thus the second hard copy and the second tape contain the correct or edited text, thereby eliminating the necessity for changes in the text produced by the typesetting machine after the lines have been transscribed by it in justified form.

The procedures described above may be carried out according to this invention so that the lines will be transcribed by the typesetting machine in justified form, and the flexibility of the methods and apparatus is such as to permit alternative methods for accommodating the requirements of justification. According to all of these methods, the apparatus for effecting the justification computing forms a part of the typesetting machine and not of the tape perforating machines. This greatly reduces the cost and complexity of the latter machines. As will hereinafter appear, the various methods permit the decisions as to where to break each line to be made either by the operator of the original tape perforator, by the operator of the second tape perforator when such is used, or by the typesetting machine automatically.

In the interest of a clear understanding, we shall first describe a procedure in which the decision as to where to break each line for proper justification is made automatically by the typesetting machine.

*Automatic justification*

We next describe one procedure according to this invention, in which the next is composed on the keyboard of a tape perforator of the type described above, without reference to the justification of the lines. The operator follows substantially the same procedure as for operating an ordinary typewriter, with certain special key operations. An unjustified hard copy resembling ordinary typewritten matter is produced. One of the special key operations consists in depressing the "discretionary hyphen" key at each position in the longer words where it is permissible to insert a hyphen and break the line according to the rules of grammer. Preferably, this is done only for words exceeding a certain length or number of characters, the exact length or number being determined by the "justification range" of the typesetting machine. This range is described in the above-mentioned copending application Serial No. 531,023, and is equal to the product of the maximum permissible interword increment width and the number of interwords in the particular line. For these purposes the typesetting machine is preferably adapted to add incremental spaces between words but not between characters in a word, except under a special condition hereinafter described under the heading "Overset Lines." Operation of the "discretionary hyphen" key produces a code in the tape but preferably does not produce a typewritten hyphen on the hard copy.

A second special key operation consists in depressing the "end-of-paragraph" key each time the operator wants a line to be terminated, for example, after the last word in a paragraph. This key has a circuit which causes the return of the typewriter carriage of the tape perforator but enters a code in the paper tape which is distinct from that entered by depression of the carriage return key.

It will be evident that according to this method the positions where the lines are broken on the hard copy bear no necessary relation to the positions where they are later to be broken on the typesetting machine.

Figure 1:
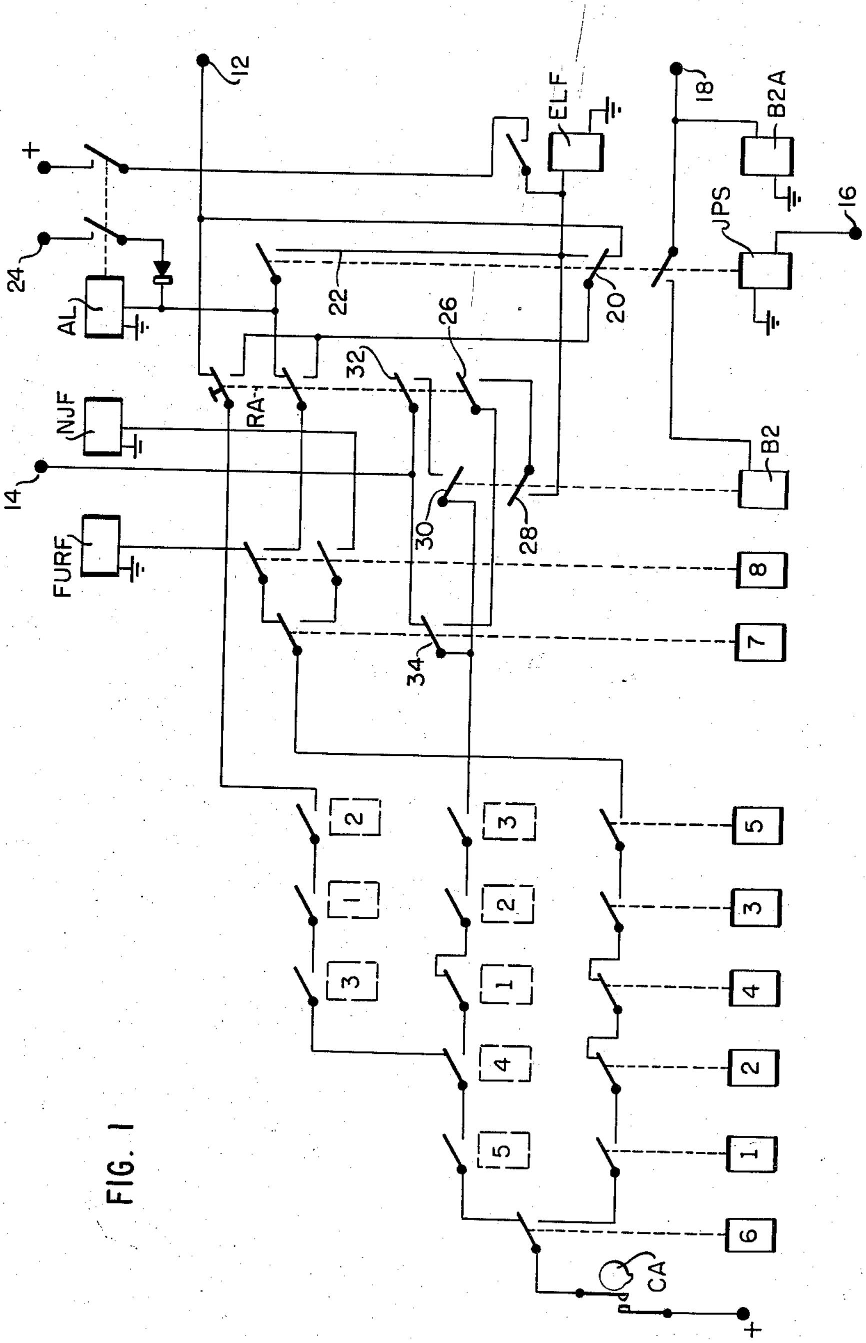
Fig. 1 is a circuit diagram of a tape reading circuit to be added to the circuits of the photocomposing machine described in said copending applications, whereby the machine is adapted to realize the objects of the invention.

Referring next to Fig. 1, there are illustrated a set of repeating relays 1 to 8 which are respectively associated with the eight channels or reading stations of a tape reader RT forming a part of the typesetting machine (Fig. 4). In the drawings, it is assumed that the contacts associated with each relay are shown in the positions reached when the operating coils are unenergized. There is also shown an "automatic return" key RA which, for the purposes of the present description, is assumed to be depressed to the position opposite to that illustrated, thereby conditioning the circuit for "automatic justification."

The tape reader is adapted to sense the perforations in the tape rapidly and in succession. The tape is advanced automatically from position to position and the advancement can be interrupted at any position by energization of a relay AL. Deenergization of the relay AL automatically permits resumption of operation of the tape reader.

The circuit of Fig. 1 is connected with that of the typesetting machine by certain output terminals. In this connection, reference is had to said copending application Serial No. 531,023. In Fig. 1 of said application there is shown a keyboard KB which operates a set of permutation bars PB, the permutation bars having three outputs, namely, a set of seven alphabetical code leads AC connected directly with a pin register REG through a pin actuating unit REC, a cable 12 connected with a multiple-circuit space code apparatus 18 (described more fully in said application Serial No. 741,209), and a lead 14 which is actuated each time the space bar is depressed. The circuit of Fig. 1 of this application is connected to the circuit of said last-mentioned application so that codes in the tape will operate the typesetting machine in the same manner as if the keyboard on said machine were being operated. To this end, the repeating relays 1–8 are connected through a circuit (not shown) to the outputs of the permutation bar unit PB in order to permit entry of characters in the typesetting machine. An output terminal 12 is connected to the lead 14 of Fig. 1 of said application and is energized to enter a word space in the typesetting machine. An output terminal 14 is connected through the above-mentioned circuit to enter a hyphen in the typesetting machine. A terminal 16 is connected with a lead JP shown in Fig. 5 of said application Serial No. 531,023, this lead being energized by a comparison circuit when the total of the widths of the characters received by the typesetting machine from the perforated tape for each line reaches the "justification range."

A terminal 18 is connected to the energizing circuit of a relay BUZ in Fig. 4 of said application Serial No. 531,023. As therein described, this circuit is energized after the terminal 16 is energized when the total of the widths of the characters is less than the justified line length which has been selected on the typesetting machine by a "line deficit" not greater than the space occupied by five characters of average width in the particular style selected.

A relay ELF is provided with contacts in parallel with a key CRK shown in Fig. 8 of said application Serial No. 531,023. Similarly, relays NJF and FURF have contacts which are in parallel, respectively, with keys NJK and FURK in the last-mentioned figure of said application. Energization of the relay ELF, therefore, initiates the "sending" of a line, that is, it initiates a calculation operation to determine the justification requirements for the line, which is automatically followed by transcription of the line from the information in the pin register, taking the justification requirements into account. Energization of the relay NJF disables the justification calculation and immediately initiates transcription of the line without the addition of incremental spaces therein. Energization of the relay FURF conditions the circuits of said last-mentioned application whereby the sending of a line immediately causes the entry of a space equal to the "line deficit," i.e., the space required for justification, followed by the transcription of the characters without justification increments, the last character falling automatically at the margin of the line opposite to that at which transcription is ordinarily started.

The operation of the circuit of Fig. 1 may be followed with reference to the above table giving the codes for the various keys of the tape perforator. It will be observed that the typesetting machine may terminate a line upon the appearance of a word space code, a carriage return code, an end-of-paragraph code, or a discretionary hyphen code on the tape. The termination of a line is effected by energization of the relay NJF or the relay ELF and is made conditional on whether (*a*) neither of the terminals 16 and 18 is energized, (*b*) the terminal 16 is energized alone, or (*c*) the terminals 16 and 18 are both energized. These conditions respectively represent justification not possible, justification possible by an expansion of more than the widths of five average characters, and justification possible by an expansion of less than the widths of five average characters.

The operation of the circuit of Fig. 1 is such that if justification is not possible, the "word space" and "carriage return" signals produce a word space entry by energization of the terminal 12. If justification is possible and whether or not the necessary line expansion is greater than the widths of five average characters, the appearance of a "word space" or "carriage return" code causes energization of the relay ELF to send the line. On the other hand, a "discretionary hyphen" code energizes the terminal 14 to produce a hypen and terminates the line only when a space less than five average characters is left in the line, that is, when the terminals 16 and 18 are both energized. Otherwise, the latter code produces no entry to the typesetting machine. The appearance of an "end-of-paragraph" code always terminates a line and sends it without justification.

We may trace the circuits of Fig. 1 which produce the foregoing results as follows. First, taking the case of a "word space" code, closure of a timing cam CA in the tape reader connects a battery through make contacts of the relays 1, 2, 3 and 5 and break contacts of the relays 4 and 6, through make contacts of the key RA now assumed to be in the position opposite to that shown, to a blade 20 of a relay JPS. If justification is not possible, that is, if the relay JPS is not energized through the terminal 16, the voltage goes to the terminal 12 to produce a normal space entry. On the other hand, if justification is possible the blade 20 is switched to its make contact through which the relay ELF is energized to send the line. A circuit is also closed through a lead 22 and other make contacts of the relay JPS to energize the relay AL, thereby stopping the operation of the tape reader. Holding circuits for the relays ELF and AL include make contacts of the relay AL, and both relays hold on a voltage applied to a terminal 24. The circuits of the typesetting machine of said application Serial No. 531,023 are arranged to cause energization of the terminal 24 when the line is sent. This terminal is deenergized upon completion of the justification calculation, and it is evident that the tape reader will thereupon begin to enter the next line in the register while the machine begins to transcribe the preceding line from the pin register. The speed of the machine in transcribing the characters exceeds the rate of entry of characters into the pin register by the tape reader.

A "carriage return" code closes a circuit from the battery through make contacts of the relays 1, 3, 5, 6 and 8 and break contacts of the relays 2, 4 and 7, through make contacts of the key RA to the blade 20 of the relay JPS. As in the case of the word space code discussed above, the terminal 12 is energized if justification is not possible and the relays ELF and AL are energized if justification is possible.

The code for "discretionary hyphen" closes a circuit from the battery, through make contacts of the relays 2, 3, 4, 5 and 7 and break contacts of the relays 1 and 6, through a blade 26 of the key RA to a blade 28 of a relay B2. This circuit is connected to the relays ELF and AL only for the condition when the space remaining in the line is less than the widths of five average characters, that is, only when the terminal 18 is energized. If this condition exists when the code is received, a circuit is also connected through a blade 30 of the relay B2 and a blade 32 of the key RA to the terminal 14, thereby causing the entry of a hyphen to the typesetting machine. Thus the result is the entry of a hyphen, followed immediately by the sending of the line in justified form by the circuit of said last-mentioned application.

In the case where the relay B2 is not energized when the "discretionary hyphen" code signal is received, no entry is made to the typesetting machine and the tape reader continues to receive characters for entry in the register.

It will be observed that a code 2, 3, 4, 5 always produces energization of the terminal 14 through a blade 34 and break contacts of the relay 7. This is the code for a normal hyphen entry as distinguished from the discretionary hyphen entry described above.

The "end-of-paragraph" code closes a circuit from the battery through closed contacts of the repeating relays 1, 3, 5, 6, 7 and 8 and break contacts of the relays 2 and 4, to the relay NJF. In all cases, this causes the line to be sent without justification.

The "flush right" code closes a circuit from the battery through closed contacts of the repeating relays 1, 3, 5 and 6 and break contacts of the relays, 2, 4, 7 and 8, to the relay FURF. This will cause the line to be sent as described in said last-mentioned application for the case when the key FURK in Fig. 8 thereof is depressed.

*Variation of discretionary hyphen code*

Figure 2:
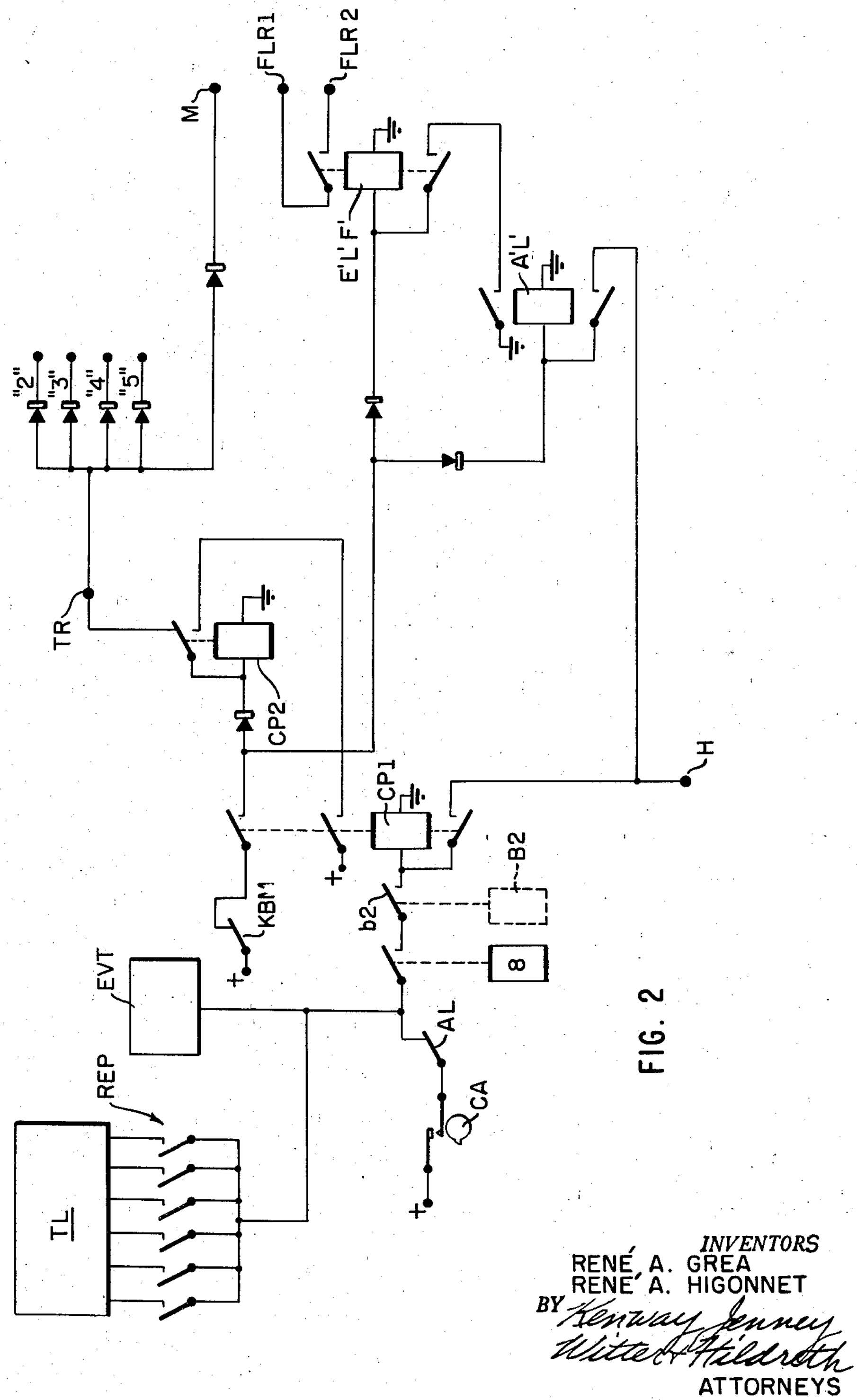
Fig. 2 is a circuit diagram showing an alternative means of operating the photocomposing machine from the perforated tape.

We next turn to a description of Fig. 2 which shows a second form of the tape reader circuit of the typesetting machine. This circuit is adapted to read a tape on which the "discretionary hyphen" code does not appear as a separate set of perforations in the tape, but rather as an additional perforation in position "8" of the code for the character next preceding each discretionary hyphen position. The tape reader operates repeating relays whose respective contacts, corresponding to the channels "1" to "6" are designated REP. When the tape reader finds a character code having a perforation in the "8" position, a circuit is connected through the timing contacts of the cam CA of the tape reader, break contacts of the relay AL and the contacts REP leading to a circuit TL. This is the circuit for entry of characters in the machine of said application Serial No. 531,023. At the same time, a circuit EVT is energized, this circuit having additional contacts of the repeating relays which, in conjuction with the circuit TL, produce the same entries to the machine of said last-mentioned application as if the character were typed on the keyboard thereof.

In addition, the relay 8 which is energized by the perforation in channel "8" closes its contacts to complete its circuit to energize a relay CP1 if the relay B2 is energized to indicate that the line deficit is within the widths of five average characters.

The relay CP1 is held operated during the period of time necessary for calculation of the justification requirements of the line by a holding circuit connected with a terminal H similar to the terminal 24 of Fig. 1.

Contacts KBM are associated with a relay in the type composing machine (not shown) which causes these contacts to be closed as soon as the character entry in the pin register has been completed. When the contacts KBM close a circuit is then completed to energize a relay CP2, a relay E'L'F' and a relay A'L' the latter two of which correspond in function to the relays ELF and AL in Fig. 1. The relay E'L'F' holds through make contacts of the relay A'L', which in turn holds through a connection to the terminal H. As explained in connection with the relay ELF in Fig. 1, the relay E'L'F' starts the calculation process. This is done by connection of terminals FLR1 and FLR2. Relay CP2 is slow to operate, and therefore a pulse equal in duration to the operating time of this relay is sent through its break contacts to energize leads "2," "3," "4" and "5" which are connected to send the same code to the typesetting machine as for the entry of an ordinary hyphen. A terminal M is also energized to enter the space width appropriate for a hyphen in the typesetting machine.

In the foregoing manner the appearance of a character code with a punch in the "8" position results in the entry of a hyphen and its width value in the typesetting machine, followed immediately by the sending of the line. This operation is, however, contingent of the contacts *b2* being closed to indicate that space for only five average characters remains in the line. It will be understood that when this variant of the invention is used, the circuits previously described with reference to the "word space," "carriage return," "end-of-paragraph," and "flush right" codes may be as shown in Fig. 1.

*Overset lines*

In certain cases, especially where line lengths are short as in newspaper columns, it may happen in the operation of the circuits of Fig. 1 or 2 that no code capable of terminating a line as described above is received while the machine is within the justification range. As will be evident from the description above, this possibility is reduced by inserting "discretionary hyphen" codes in words of relatively great length, but a problem arises where hyphenation is not permissible within the rules of grammar at any position within the justification range.

In the latter instance a method requiring the operation of the keyboard of the typesetting machine may be used. According to this method the entry of characters from the tape is automatically stopped and the typesetting machine is prevented from operating as soon as the accumulated widths of the characters from the tape exceeds the justified line length. Simultaneously a warning device is actuated to tell the operator in charge of the typesetting machine that the foregoing condition exists.

The operator then erases the characters of the last part of a word that have been entered in the typesetting machine. This is done by operation of the back-space key BSK as described in said application Serial No. 531,023. As also described in said application, starting with the last character received from the tape, each character is erased from the machine by a cyclic operation, until all of the characters in this last word have been erased. The next entry to be erased is the interword space preceding the word, and this erasure is indicated by movement of a word space counter CJ in said application to the next lower count. This is preferably indicated by lamps associated with the levels of the counter CJ. The operator then releases the backspace key and sends the line as described in said application. It will be understood that the operator also back-spaces the perforated tape on the tape reader by the same number of steps taken by the backspace key.

It will be noted that in this case the line is sent when it is in a condition where justification is not possible within the limits previously defined. The operator must therefore make further adjustments of the circuit of said application Serial No. 531,023 to increase the length of the zone within which justification is possible for this particular line. This is accomplished in said application by keys AK and BK in Fig. 6 thereof which, following the sending of this particular line, are returned to their original positions.

Figure 3:
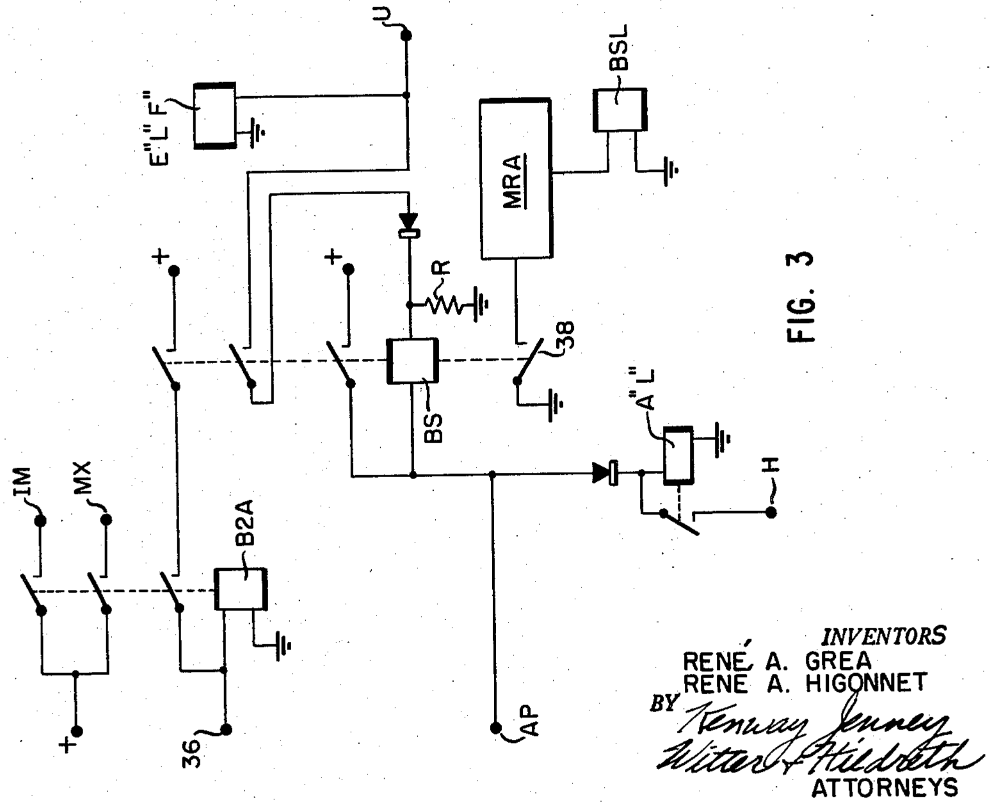
Fig. 3 is a circuit diagram showing apparatus permitting adaptation of the invention to the special case of an overset line.

The circuit of Fig. 3 shows an automatic arrangement for accomplishing the functions described above. When a signal is received to indicate that the justification length has been exceeded, it appears at a terminal AP, whereby relays BS and A″L″ are energized. The relay A″L″ stops the tape reader and holds through a terminal H which is energized until completion of the calculation. The relay BS locks directly to a battery by its own make contacts.

A terminal 36 corresponds to the terminal 18 of Fig. 1 and is energized when the line deficit is reduced to less than the widths of five average characters. Prior to energization of the terminal AP, the terminal 36 has been energized and a relay B2A has been actuated. This energizes terminals IM and MX which respectively place the typesetting machine in condition to permit the highest possible value of the interword increment which may be added, and close a circuit in parallel with the key MK of Fig. 8 of said application Serial No. 531,023. As described in said application, the key MK permits "mixed justification," that is, justification by insertion of space increments between characters as well as between words. By this means, as in the manual operation discussed above, the line becomes justifiable after the erasure of the last part of a word therein.

Operation of the relay BS as described above, which occurs when the justification length has been exceeded, forms a holding circuit for the relay B2A and through make contacts 38 energizes a circuit MRA in the memory unit of the typesetting machine. This circuit (not shown in detail) causes the inverse-order successive erasure of the character codes in the register and the subtraction of their widths from the accumulator in Fig. 4 of said application Serial No. 531,023. A relay BSL is energized to back-space the tape reader one row of perforations each time a character is erased from the register. This may be accomplished by a conventional mechanism including a pawl and ratchet wheel or any equivalent device. The operation of the circuit MRA continues automatically by repeatedly subtracting characters until a position is reached in the register where a word space code appears. This code is sent by the circuits of the typesetting machine to a terminal U (Fig. 3); whereupon the battery is short-circuited across the coil of the relay BS, deenergizing this relay; and a relay E″L″F″ is energized. The erasing operation is also interrupted.

The relay E″L″F″ serves a function similar to the relay ELF of Fig. 1 and initiates the justification calculation and transcription of the line. The deenergization of the relay A″L″ at the completion of the calculation operation returns the circuit to its original position for the recording of the next line. It will be understood that this line will begin with the recording of the word partialy entered to, and then erased from, the preceding line as described above.

*Lines broken on tape perforator*

As previously stated, a variation in the operation of the machine described above may be carried out, in which the operator of the tape perforator decides where each line will be broken. To this end it is necessary for the operator to know when the total of the widths in a composed line brings it within the justification range. Margins are preferably drawn on the hard copy and the typewriter is preferably of the proportional spacing type, giving variable character spaces which approximate those actually used for the characters in the typesetting machine as described in said application Serial No. 531,023.

The operator composes each line by completing a word or hyphenating it within the justification range on the hard copy, and then depresses the carriage return key.

In this case, the circuit of Fig. 1 is modified by causing the key RA to be moved to the position shown in Fig. 1. In this position of the key RA, the only code that will energize the lead 22 to actuate the relays ELF and AL to send each line is the end-of-line code as given in the above table. In every case, the appearance of this code occurs after the relay JPS has been energized, and therefore the typesetting machine immediately begins the calculation operation which is followed by the transcription of the line.

It will be observed that a further variation of the foregoing method may be accomplished by preparing the tape according to the automatic methods previously described without reference to justification, and then placing this tape in a second tape perforator having a keyboard at which an operator determines the positions where the lines are to be broken. Thus the operator of the second perforator stops the typing of each line when his hard copy shows that the line is within the justification range. At this point a code is inserted in the second perforated tape to produce a carriage return signal. In addition to this operation, the operator may insert any corrections in the second perforated tape.

It will be apparent from the foregoing description that methods and apparatus have been described which will permit the employment of a register in the form of a tape perforator, a magnetic tape or other equivalent means, in conjunction with the typesetting machine described in said above-mentioned applications. The circuits of the machine described in said applications may be used substantially as therein described, with the circuits of this application being connected thereto in the manner described above, as will be fully evident to one skilled in this art. Thus greatly enhanced versatility and usefulness of the typesetting machine have resulted.

It will be understood that while the present invention has been described and illustrated with respect to certain specific methods and circuits and variations thereof, it is by no means limited to these specifically in every detail, and various changes in accordance with recognized techniques may be made without departing from the spirit or scope of the invention.

Having thus described the invention, we claim:

1. The method of composing justified lines which consists in selecting the characters and spaces at a keyboard while causing coded information corresponding to a plurality of lines thereof to be entered in a register, transferring the register to a typesetting machine, and operating said machine by reading said coded information while measuring the difference between the space occupied by a succession of said characters and the justified line length, terminating the reading of said information when a space code is read after said difference has been reduced to a predetermined level, and composing the characters read before said termination in a justified line.

2. The method of composing justified lines which consists in selecting the characters and spaces at a keyboard while causing coded information corresponding to a plurality of lines thereof to be entered in a register, said selection including the entry of a unique code in the register at each position in a word where hyphenation is permissible, transferring the register to a typesetting machine, and operating said machine by reading said coded information while measuring the difference between the space occupied by a succession of said characters and the justified line length, terminating the reading of said information when said unique code is read after said difference has been reduced to a predetermined level, and composing the characters read before said termination in a justified line.

3. The method of composing justified lines which consists in selecting the characters and spaces at the keyboard of a typewriter while causing coded information corresponding to a plurality of lines thereof to be entered in a register, said information including a specific code corresponding to each operation of the space key and carriage return mechanism on said typewriter, transferring the register to a typesetting machine, and operating said machine by reading said coded information while measuring the difference between the space occupied by a succession of said characters and the justified line length, terminating the reading of said information when a code corresponding to a space or carriage return is first read after said difference has been reduced to a predetermined level, and composing the characters read before said termination in a justified line.

4. The method according to claim 3, wherein a unique code is entered in the register at each position in a word where hyphenation is permissible, said termination being further effected when said unique code is read after said difference has been reduced to a second predetermined level.

5. The method according to claim 3, wherein a unique code is entered in the register at each position in a word where hyphenation is permissible, said termination being further effected when said unique code is read after said difference has been reduced to a second predetermined level smaller than the level at which the space and carriage return codes cause said termination.

6. The method of composing justified lines which consists in selecting the characters and spaces at the keyboard of a typewriter while causing coded information corresponding to a plurality of lines thereof to be entered in a register, accumulating a measure of the widths of said characters and spaces in each line and operating the carriage return mechanism when the difference between the justified line length and said accumulated widths is reduced to a predetermined level, operation of the carriage return code mechanism producing a specific code in the register, transferring the register to a typesetting machine, and operating said machine by reading said coded information, terminating said reading when the carriage return code is read, and composing the characters read before said termination in a justified line.

7. The method of composing justified lines which consists in selecting the characters and spaces at a keyboard while causing coded information corresponding to a plurality of lines thereof to be entered in a register, a distinct code being entered at the end of each paragraph, transferring the register to a typesetting machine, and operating said machine by reading said coded information while measuring the difference between the space occupied by a succession of said characters and the justified line length, terminating the reading of said information when a space code is read after said difference has been reduced to a predetermined level, and composing the characters read before said termination in a justified line, termination also being effected and the characters being composed without justification when said distinct code is read.

8. The method of composing justified lines which consists in selecting the characters and spaces at a first keyboard device while causing coded information corresponding to a plurality of lines thereof to be entered in a first register, transferring the first register to a second keyboard device, operating the last-mentioned device to read said information and simultaneously to enter a copy thereof in a second register, interrupting the operation of the second keyboard device, selecting characters thereon and entering the same in the second register, transferring the second register to a typesetting machine, and operating said machine by reading said coded information while measuring the difference between the space occupied by a succession of said characters and the justified line length, terminating the reading of said information when a space code is read after said difference has been reduced to a predetermined level, and composing the characters read before said termination in a justified line.

9. The method according to claim 2, wherein said unique code is entered at a position in the register following the character next preceding a permissible hyphenation position.

10. The method according to claim 2, wherein said unique code is entered at the position in the register corresponding to the character next preceding a permissible hyphenation position, said code being superposed on the code of said character.

11. The method of composing justified lines which consists in selecting the characters and spaces at a keyboard while causing coded information corresponding to a plurality of lines thereof to be entered in a first register, transferring the first register to a typesetting machine, and operating said machine by reading said coded information, entering the same in a second register while measuring the space occupied by a succession of said characters, terminating the reading of said information when said space exceeds the justified line length, erasing from the second register any fraction of a word not fully entered therein, and composing the characters read before said termination, less said fraction of a word, in a justified line.

12. The method of composing justified lines which consists in selecting the characters and spaces at a keyboard while causing coded information corresponding to a plurality of lines thereof to be entered in a first register, transferring the first register to a typesetting machine, and operating said machine by reading said coded information, entering the same in a second register while measuring the difference between the space occupied by a succession of said characters and the justified line length, terminating the reading of said information when a space code is read after said difference has been reduced to a predetermined level or when said difference is eliminated, whichever shall first occur, erasing from the second register any fraction of a word not fully entered therein if said difference has been eliminated, and composing the characters read before said termination, less said fraction of a word, in a justified line.

13. In type composing apparatus having a register in combination with a circuit adapted for entry of information corresponding to selected characters and spaces in the register, an accumulator connected to said circuit and adapted to measure the space occupied by a succession of said characters and transcription means to transcribe the characters in the register in a justified line, a device for reading coded character information stored in a tape, said device being connected to said circuit and having means operated by a code in said tape to terminate the reading of the tape and to initiate the operation of said transcription means.

14. In type composing apparatus having a register in combination with a circuit adapted for entry of information corresponding to selected characters and spaces in the register, an accumulator connected to said circuit and adapted to measure the space occupied by a succession of said characters, a comparison device to measure the difference between the justified line length and said space and means to transcribe the characters in the register in a justified line, a device for reading coded character information in a tape, said device being connected to said circuit and having means operable by a code in said tape if said difference is reduced below a predetermined level to terminate the reading of the tape and to initiate the operation of said transcription means.

15. In type composing apparatus having a register in combination with a circuit adapted for entry of information corresponding to selected characters and spaces in the register, an accumulator connected to said circuit and adapted to measure the space occupied by a succession of said characters, a comparison device to measure the difference between the justified line length and said space and means to transcribe the characters in the register in a justified line, a device for reading coded character information in a tape, said device being connected to said circuit and having means operable by a first code representing a word space and a second code representing a carriage return, if said difference is reduced below a predetermined level, to terminate the reading of the tape and to initiate the operation of said transcription means.

16. The combination according to claim 15, wherein a switch is provided in said device, said switch being operable to permit said termination and transcription by both said first and second codes in one position and by said second code only in the other position.

17. In type composing apparatus having a register in combination with a circuit adapted for entry of information corresponding to selected characters and spaces in the register, an accumulator connected to said circuit and adapted to measure the space occupied by a succession of said characters, a comparison device to measure the difference between the justified line length and said space and means to transcribe the characters in the register in a justified line, a device for reading coded character information in a tape, said device being connected to said circuit and having means operable if said difference is eliminated when a word is partially entered in the register to terminate the reading of said information, to erase the part of said word from the register and to initiate transcription of the characters remaining in the register.

18. The combination according to claim 17, wherein means are provided to index the tape forwardly after the information corresponding to each character is read and to backspace the tape as each character is erased from the register.

No references cited.